UNITED STATES PATENT OFFICE.

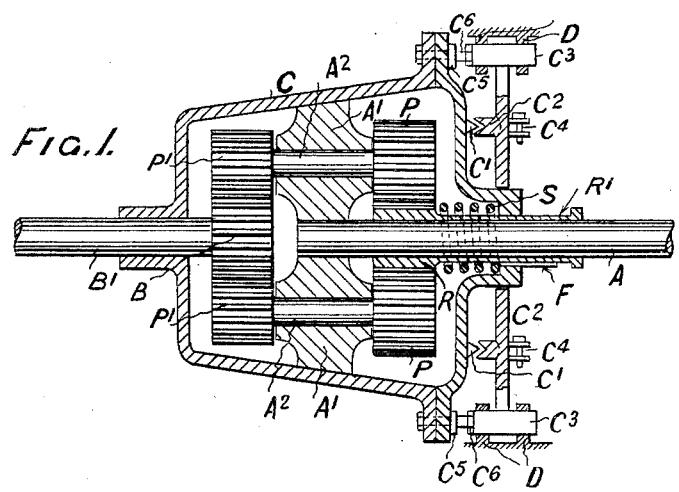
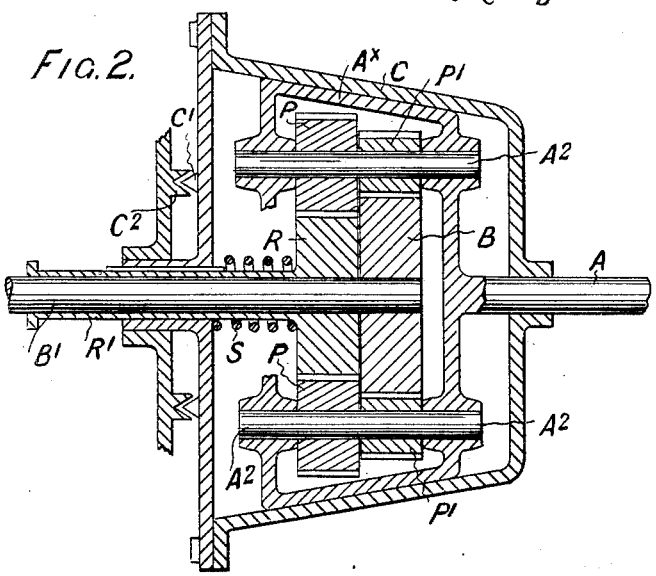

WALTER GORDON WILSON, OF WESTMINSTER, ENGLAND.

CHANGE OR REVERSING GEAR.

SPECIFICATION forming part of Letters Patent No. 675,433, dated June 4, 1901.

Application filed August 9, 1900. Serial No. 26,399. (No model.)

*To all whom it may concern:*

Be it known that I, WALTER GORDON WILSON, engineer, a subject of the Queen of Great Britain and Ireland, residing at 34 Great Peter street, in the city of Westminster, England, have invented new and useful Improvements in Change or Reversing Gears, of which the following is a specification.

This invention relates to those sets of gear used for reducing or increasing the velocity of the driven shaft and is to enable the latter to be advantageously driven at two speeds in the same direction or, if desirable, upon changing the gear to cause a reversal of motion in the driven shaft.

According to my invention I provide two friction-clutches acting upon an outer casing. When one of these friction-clutches is in gear, the whole of the gearing is locked, so that the driven shaft is revolved at the same velocity as the driving-shaft. In releasing the one clutch the other is brought into gear and the differential gearing is freed, so that the aforesaid driven shaft rotates at a reduced speed in the same direction or at an increased, equal, or reduced speed in the opposite direction, according to the ratio of the aforesaid differential gearing.

Figure 1 of the accompanying sheet of drawings represents in longitudinal section one form of gear constructed according to my invention, and Fig. 2 is a similar view of a slightly-modified form.

Referring to Fig. 1, it will be seen that upon the end of the driving-shaft A there is rigidly attached what is hereinafter called the "friction-wheel" A', the periphery of which forms a cone, and through the web of this friction-wheel are mounted what are hereinafter called the "differential counter-shafts" $A^2$, of which one or more may be used and of which two are shown in the drawings as being preferable to one. On each end of these aforesaid differential counter-shafts $A^2$ are attached two spur gear-wheels, (marked P and P',) of which those marked P' are adapted to gear with a gear-wheel B on the driven shaft B', and those marked P gear with a gear-wheel R, attached to a loose concentric sleeve R' upon the driving-shaft A, said sleeve being held against longitudinal motion on said shaft by any suitable means. Upon this concentric sleeve R' is attached the outer casing C, which forms an internal cone, which casing is free to move laterally, but not circumferentially, upon the sleeve by means, for example, of a feather F and feather-way. Upon the end of this outer casing C is formed what shall hereinafter be described as the "friction-ring" C', with which a brake-ring $C^2$ is arranged to engage at will. This brake-ring $C^2$ has lugs $C^3$, arranged to slide in fixed guides D, and the brake-ring is further provided with lugs $C^4$, to which is pivoted a forked lever or the like (not shown) to effect the movement of the brake-ring against or away from the friction-ring C'. The outer casing is also provided with a number of ratchet-teeth $C^5$, and the brake-ring has a pawl or pawls $C^6$ to engage in the said ratchet-teeth, for when the brake-ring is brought to bear against the friction-ring C' of the casing C and the latter moves out of contact with the friction-wheel A' there is a tendency for the casing C to revolve, and this revolution is prevented by the pawls taking in between the ratchet-teeth $C^5$, thus preventing movement of the casing without applying much pressure by the brake-ring. There is, further, a helical or other spring S between the spur-wheel R and the end of the casing C, which spring constantly tends to cause the spring-casing to engage with the friction-wheel A'; but it is evident that other means for causing the engagement of the casing and friction-wheel may be employed.

In the modified construction shown in Fig. 2 the only practical differences are that the friction-wheel $A^\times$ is so formed as to contain the spur-wheels P and P', and the loose sleeve R', carrying the spur-wheel R, is mounted on the driven shaft B' instead of on the driver A. Otherwise the description referring to Fig. 1 applies equally as regards this Fig. 2. It will now be seen that when the friction-wheel A', Fig. 1, or $A^\times$, Fig. 2, engages the aforesaid outer casing C the loose sleeve R', and consequently the gear-wheel R thereon, all rotate at the same velocity, and as this aforesaid friction-wheel is attached rigidly to the driving-shaft A the speed of rotation must be the same as that of the said driving-shaft. This being the case, it becomes evident that there will be no relative motion between the gear-wheel R, mounted on the loose sleeve R', and the gear wheel or wheels P upon the differential counter-shaft or counter-shafts $A^2$. Therefore it is evident that the gearing is locked in such manner that the driven shaft B is carried around with and at the same speed of rotation as the driving-shaft A. When it is required to alter the speed, the aforesaid friction-ring $C'$ is engaged by a clutch or, as shown, by a brake-ring $C^2$, which does not revolve. On applying sufficient pressure to the brake-ring $C^2$ by means of a lever or other suitable means the outer casing C is caused to move along the aforesaid loose sleeve $R'$ against the resistance of the spring S, if there be one, thus causing the friction-wheel ($A'$, Fig. 1, or $A^\times$, Fig. 2) to be thrown out of gear and leaving it free to rotate. It will now be seen that the outer casing C, loose sleeve $R'$, and gear-wheel R (being attached to one another rigidly as far as rotary motion is concerned) are kept stationary by means of the friction-clutch $C^2$ engaging with the aforesaid friction-ring $C'$. Now as the driving-shaft A rotates and with it the friction-wheel $A'$ and differential counter-shafts $A^2$ these latter will be rotated upon their own axes, owing to the gear-wheel upon the loose sleeve $R'$ being stationary, and the said counter-shafts $A^2$ will therefore transmit a resultant forward or backward motion to the driven shaft $B'$ by means of the gear-wheel B, according to the ratio of the gear-wheels on the counter shaft or shafts and on the sleeve and driven shaft to each other. For example, if the gear-wheels P, gearing with the spur-wheel R, be larger than the gear-wheels $P'$, gearing with the spur-wheel B, and the gear-wheel R be consequently less than the gear-wheel B then when the casing C is not in contact with the friction-wheel $A'$, but is stationary, (as is of course also the gear-wheel R,) the result will be that the shaft $B'$ is revolved at a reduced speed as compared with the shaft A, but in the same direction. If, however, the casing C be in contact with the friction-wheel $A'$, both the shafts revolve together at the same speed. Supposing, on the other hand, the pinions $P'$ be larger than the pinions P, then when the outer casing C is not in contact with the friction-wheel $A'$, but is stationary, the shaft $B'$ will be revolved in the opposite direction to the shaft A at a reduced speed, an equal, or an increased speed, all according to the ratios of the gear-wheels R, P, $P'$, and B.

If the shaft B be used as the driving-shaft and the shaft A as the driven shaft, then the results are reversed, and thus by my invention the gearing can be used as a "step-up" gear as well as a "step-down" change-gear.

I may also arrange the gear so that instead of the gearing being locked by means of the friction-wheel the driven shaft shall rigidly engage the outer casing, or should it be required both arrangements may be used at the same time.

What I claim as my invention, and desire to secure by Letters Patent, is—

1. Change-gear comprising a driving-shaft a friction-wheel mounted on said driving-shaft, a counter-shaft or counter-shafts mounted in said friction-wheel, an outer casing adapted to engage with said friction-wheel and to be disengaged therefrom, a sleeve having a pinion or gear-wheel thereon adapted to revolve with the casing, a gear wheel or wheels keyed to one end of the counter-shaft or counter-shafts, and meshing with the pinion on said sleeve, a brake or clutch mechanism adapted to engage with the outer casing, a driven shaft a gear-wheel mounted thereon and a gear wheel or wheels mounted on the other end of the counter shaft or shafts meshing with the gear-wheel on the driven shaft, substantially as set forth.

2. Change-gear comprising a driving-shaft, a friction-wheel mounted thereon, a counter-shaft or counter-shafts mounted in said friction-wheel, an outer casing adapted to engage with said friction-wheel and to be disengaged therefrom, means for preventing the outer casing from revolving in the opposite direction when arrested, means for causing the outer casing to engage normally with the friction-wheel, a sleeve having a gear-wheel thereon adapted to revolve with the casing, a gear wheel or wheels keyed to one end of the counter-shaft or counter-shafts, and meshing with the pinion on said sleeve, a brake or clutch mechanism adapted to engage with the outer casing, a driven shaft and a gear-wheel mounted thereon, and a gear wheel or wheels mounted on the other end of the counter shaft or shafts meshing with the gear-wheel on the driven shaft, substantially as set forth.

3. Change-gear comprising a driving-shaft a gear-wheel mounted thereon, a driven shaft, a friction-wheel mounted thereon, a counter-shaft or counter-shafts mounted in said friction-wheel, a pinion or pinions at one end of said counter shaft or shafts meshing with the gear-wheel on the driving-shaft, an outer casing, a sleeve, a gear-wheel thereon, said sleeve adapted to revolve with said outer casing, the latter adapted to engage with the friction-wheel and to be disengaged therefrom, means for preventing the rotation of the casing when so disengaged, and a gear wheel or wheels on the other end of the counter-shaft or counter-shafts meshing with the aforesaid gear-wheel on the sleeve substantially as set forth.

4. Change-gear comprising a driving-shaft, a gear-wheel mounted thereon, a driven shaft, a friction-wheel mounted thereon a counter-shaft or counter-shafts mounted in said friction-wheel, a pinion or pinions at one end of said counter-shaft or counter-shafts meshing with the gear-wheel on the driving-shaft, an outer casing, a sleeve, a gear-wheel thereon and adapted to revolve with said outer casing, the latter adapted to engage with the friction-wheel and to be disengaged therefrom, means for causing the outer casing to engage with the friction-wheel means for causing the outer casing to be disengaged from the friction-wheel and to remain stationary and a gear wheel or wheels on the other end of the counter-shaft or counter-shafts meshing with the aforesaid gear-wheel on the sleeve substantially as set forth.

5. The combination with change-gear comprising a driving-shaft, a driven shaft, an outer casing, a friction-wheel, means for causing the engagement and disengagement of the outer casing and the friction-wheel, a counter shaft or shafts in said friction-wheel, gear-wheels on said shaft or shafts and a gear-wheel on the driven shaft meshing with the gear wheel or wheels on the counter shaft or shafts of a sleeve, a gear-wheel thereon meshing with the gear wheel or wheels on the counter shaft or shafts substantially as set forth.

6. The combination with change-gear comprising a driving-shaft, a driven shaft, an outer casing, a friction-wheel, means for causing the engagement and disengagement of the outer casing and the friction-wheel, a counter shaft or shafts, in said friction-wheel, gear-wheels at each end of said counter shaft or shafts and a gear-wheel on the driving-shaft meshing with the gear wheel or wheels at one end of the counter shaft or shafts, of a sleeve, a gear-wheel thereon meshing with the gear wheel or wheels at the other end of the counter shaft or shafts substantially as set forth.

7. The combination with a driving-shaft and a driven shaft, of differential gearing connecting said shafts, a friction-clutch acting upon the gearing to revolve the driven shaft at the same speed as the driving-shaft, means, operating automatically, to hold said clutch in engagement with said gearing, and means for disengaging the clutch, for the purpose set forth.

In testimony whereof I have signed my name to this specification in the presence of two subscribing witnesses.

WALTER GORDON WILSON.

Witnesses:
V. JENSEN,
WALTER E. ROCHE.